United States Patent [19]

Havins

[11] Patent Number: 4,982,924
[45] Date of Patent: Jan. 8, 1991

[54] MOUNTING APPARATUS FOR SONAR TRANSDUCER

[75] Inventor: Felton H. Havins, Graham, Tex.

[73] Assignee: Aero Marine Engineering, Inc., Bryson, Tex.

[21] Appl. No.: 482,159

[22] Filed: Feb. 20, 1990

Related U.S. Application Data

[63] Continuation-in-part of Ser. No. 314,903, Feb. 24, 1989, Pat. No. 4,928,915, and a continuation-in-part of Ser. No. 459,597, Jan. 2, 1990.

[51] Int. Cl.$^5$ .................. H04R 1/44; B63B 17/00
[52] U.S. Cl. .................. 248/288.5; 248/295.1; 367/173
[58] Field of Search .................. 248/228.5, 288.3, 291, 248/295.1, 205.1, DIG. 4; 114/364; 367/173

[56] References Cited

U.S. PATENT DOCUMENTS

| | | | |
|---|---|---|---|
| 1,285,218 | 11/1918 | Kershaw | 248/288.5 |
| 1,303,345 | 5/1919 | McFeaters | 248/288.5 |
| 3,039,078 | 6/1962 | Wilcoxon | 367/173 |
| 4,282,590 | 8/1981 | Wingate | 367/173 |
| 4,285,485 | 8/1981 | Burke | 367/173 |
| 4,485,462 | 11/1984 | Wiegner | 367/173 |
| 4,928,915 | 5/1990 | Havins | 248/288.5 |

*Primary Examiner*—Reinaldo P. Machado
*Attorney, Agent, or Firm*—Geoffrey A. Mantooth; James C. Fails

[57] ABSTRACT

An apparatus mounts a sonar transducer to a boat. The apparatus includes a tubular member with a handle at one end and a transducer mounting bracket at the other end. The transducer mounting bracket is adapted to couple to a sonar transducer. Both the handle and the transducer mounting bracket are pivotally coupled to the tubular member and to each other by a linkage rod. By moving the handle up or down, the transducer mounting bracket will move correspondingly to a new elevational orientation. In one embodiment, the tubular member is received by a cylindrical bore in a ball; the ball is mounted to the boat. By turning the handle to one side, the tubular member and the transducer mounting bracket will correspondingly turn to a new azimuthal orientation. In another embodiment, the tubular member is received by a sleeve mounted in a pivotable ball. The tubular member can move relative to the sleeve. Locking nuts on the sleeve, when tightened, prohibit movement of the tubular member. Frictional adjustments are provided at the handle and the transducer mounting bracket.

21 Claims, 9 Drawing Sheets

MOUNTING APPARATUS FOR SONAR TRANSDUCER

This is a continuation-in-part of co-pending application Ser. No. 07/314,903, filed Feb. 24, 1989 now U.S. Pat. No. 4,928,915 and is a continuation-in-part of co-pending application Ser. No. 07/459,597 filed Jan. 2, 1990.

FIELD OF THE INVENTION

The present invention relates to apparatuses for mounting sonar transducers to boats.

BACKGROUND OF THE INVENTION

Fishermen and pleasure boaters use sonar instrumentation for fish finding and for determining the depth of the water. The sonar instrumentation uses a sonar transducer that emits sound waves in a conical beam, thus giving the transducer directional capabilities.

In the prior art, transducers are mounted to a boat by attachment to the bottom of the hull, to the transom, or to a trolling motor, or by mounting the transducer in the hull. The orientation of most transducers is fixed in the downward direction so that the sonar transducer scans the water directly beneath the boat.

There are many instances however, when it is desirable to scan the water laterally around the boat. For example, in fish finding applications, it is frequently easier to locate fish with side-scanning sonar than with down-scanning sonar. In depth finding applications, if the boat is near a cliff, it is frequently desirable to have side-scanning sonar capabilities to examine the underwater extent of the cliff. With prior art mounted sonar transducers, such side-scanning is impossible. What is needed then is an apparatus for mounting a sonar transducer to a boat, which apparatus will allow the transducer to scan laterally of the boat.

SUMMARY OF THE INVENTION

It is an object of the present invention to provide an apparatus for mounting a sonar transducer to a boat, which apparatus allows sonar scanning of the water laterally around the boat.

It is another object of the present invention to provide a sonar transducer mounting apparatus that provides for changes in the elevational and azimuthal orientations of the transducer.

The mounting apparatus of the present invention includes a first member, handle means, transducer mounting means, a second member, and first member mounting means. The first member has first and second end portions. The handle means is pivotally coupled to the first member first end portion, while the transducer mounting means is pivotally coupled to the first member second end portion such that the transducer mounting means can change elevational orientation with respect to a water line of the boat. The transducer mounting means is adapted for coupling to a sonar transducer. The second member is located adjacent to the first member and is coupled to the handle means and to the transducer means so as to link the transducer mounting means to the handle means. When the handle means pivots, the transducer mounting means correspondingly changes its elevational orientation. The first member mounting means mounts the first member to the boat such that the handle means, the first member, and the transducer mounting means can vary their azimuthal orientation. The first member mounting means includes a sleeve and sleeve retaining means. The sleeve has a bore therethrough for receiving the first member, with the first member being slidable with respect to the sleeve. The sleeve retaining means is adapted to couple the sleeve to the boat Locking means releasably locks the first member in position relative to the first member mounting means.

The mounting apparatus of the present invention allows the remote operation of the submerged transducer. The operator can manipulate the orientation of the transducer from a comfortable position above the water. By moving the handle means up or down, the elevational orientation of the transducer is varied accordingly. By turning the handle means from side to side, the azimuthal orientation of the transducer is varied accordingly. Thus, sonar scanning is not limited to areas beneath the boat, but rather encompasses areas all around the boat, including areas near the surface of the water.

In another aspect, clamp means are provided for coupling the handle means to the first member. The clamp means provides adjustable compressive force on the handle means so that the ease of pivotal movement of the handle means is adjusted by adjusting the compressive force of the clamp means.

In still another aspect, the transducer mounting means comprises a plate member and stiff and resilient strips. The strips couple the transducer to the plate member.

In still another aspect plural transducers are coupled to the transducer mounting means. The transducers have sonar beams and are oriented with respect to each other such that the beams are adjacent to each other.

DESCRIPTION OF PREFERRED EMBODIMENTS

Figure 1:
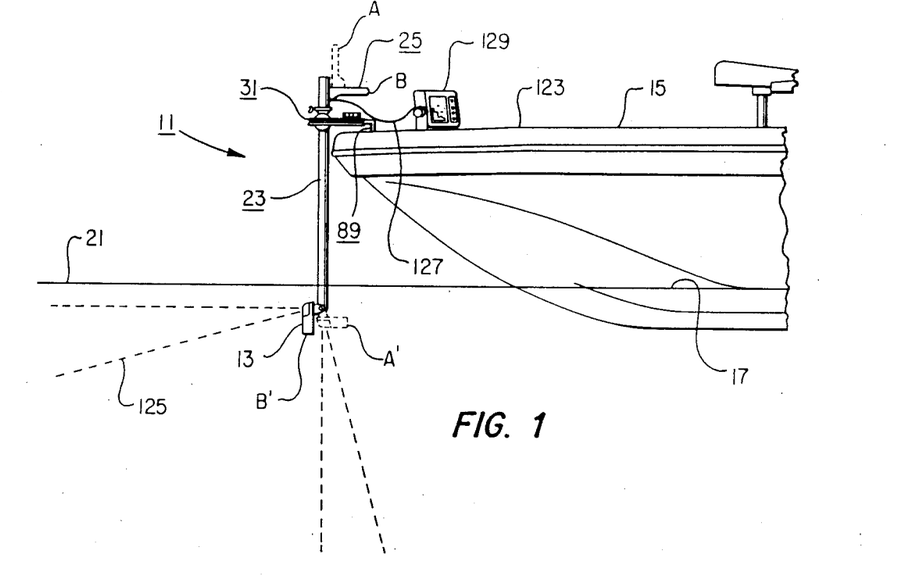
FIG. 1 is a side view of the bow portion of a boat, showing the mounting apparatus of the present invention, in accordance with a preferred embodiment.

In FIG. 1, there is shown a side view of the mounting apparatus 11 of the present invention, in accordance with a preferred embodiment. The mounting apparatus 11 of the present invention is used to mount a sonar transducer 13 to a boat 15 and allows the sonar transducer to change its elevational orientation relative to the water line 17 of the boat (or surface of the water 21) and its azimuthal orientation relative to the center line 19 of the boat (see FIG. 2). By changing the elevational orientation of the sonar transducer 13, areas ranging from directly under the boat to areas near the surface 21 of the water can be scanned with sonar. By changing the azimuthal orientation of the sonar transducer, a 360 degree sonar scan around the boat can be accomplished without having to turn the boat 15.

Figure 3:
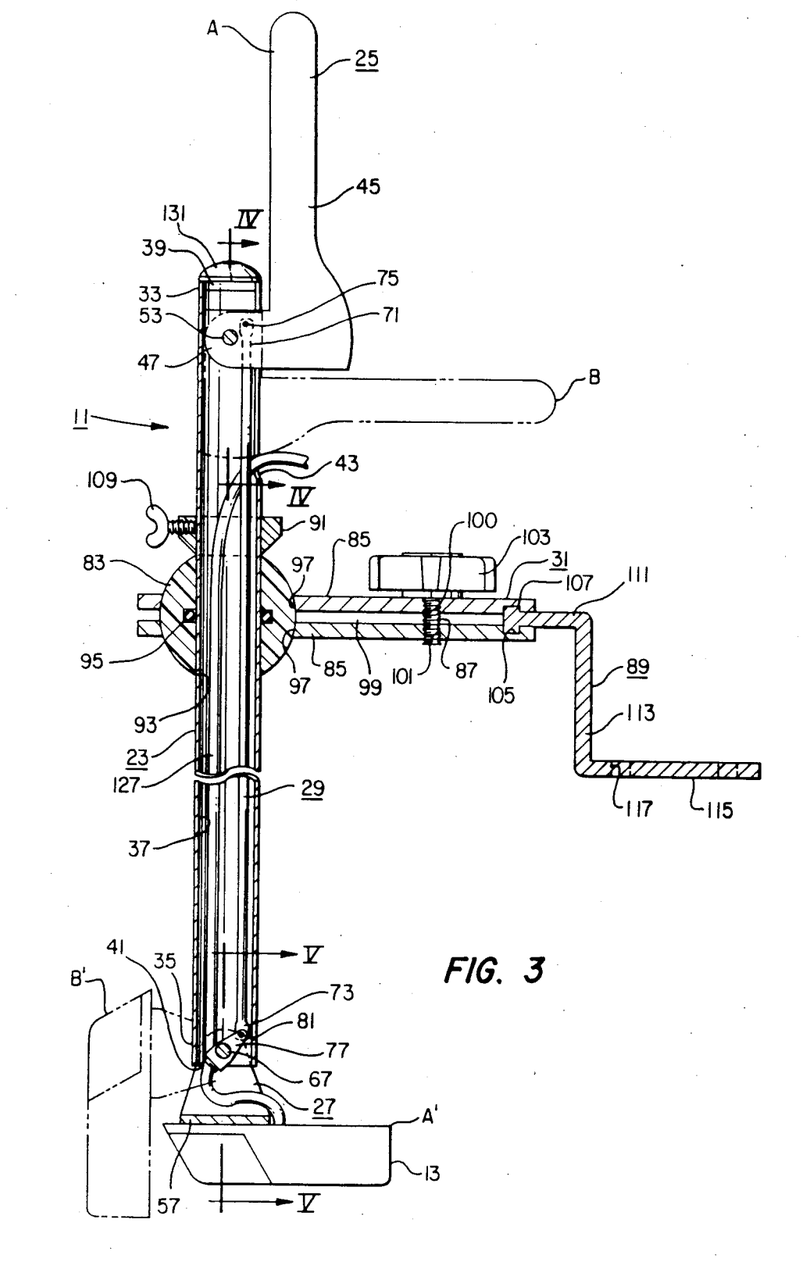
FIG. 3 is a longitudinal cross-sectional side view of the mounting apparatus, taken through lines III—III of FIG. 2.

Referring to FIG. 3, the mounting apparatus 11 of the present invention includes a tubular member 23, a handle 25, a transducer mounting bracket 27, a linkage rod 29, and a mounting assembly 31.

The tubular member 23 is a tube having first and second ends 33, 35. The tubular member 23 has an interior cavity 37 with openings 39, 41 at the first and second ends 33, 35 that allow communication between the exterior of the tubular member and the interior cavity. The first end 33 of the tubular member has a longitudinal slot 43 that extends for a short distance towards the second end.

Figure 4:
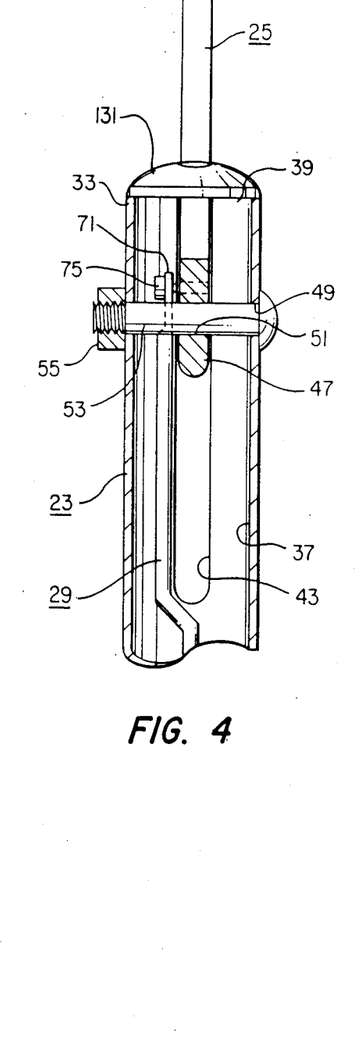
FIG. 4 is a longitudinal cross-sectional view of the mounting apparatus, taken through lines IV—IV of FIG. 3, showing how the handle is pivotally mounted.

Referring to FIGS. 3 and 4, the slot 43 receives a portion of the handle 25. The handle 25 is a flat plate that has two integral segments, a long segment 45 and a short segment 47, that are perpendicular to each other. The short segment 47 is received by the slot 43 and the interior cavity 37 of the tubular member 23 where the handle is pivotally coupled to the tubular member 23 near the first end 33. The short segment 47 of the handle 25 and the tubular member first end have respective circular openings 49, 51 for receiving a bolt 53. The bolt 53, which is oriented perpendicularly to the handle 25, extends through one of the tubular member openings 49, into the interior cavity 37, through the handle opening 51, into the interior cavity again, and through the other the tubular member openings 49. A nut 55 retains the bolt 53 in place. The tubular member slot 43 maintains the handle short segment 47 in the center of the interior cavity. The handle is pivotable between first and second orientations A, B. In the first orientation A, the long segment 45 of the handle is parallel to the longitudinal axis of the tubular member 23, which axis extends between the first and second ends 33, 35. In the second orientation B, the long segment 45 is perpendicular to the longitudinal axis of the tubular member.

Figure 5:
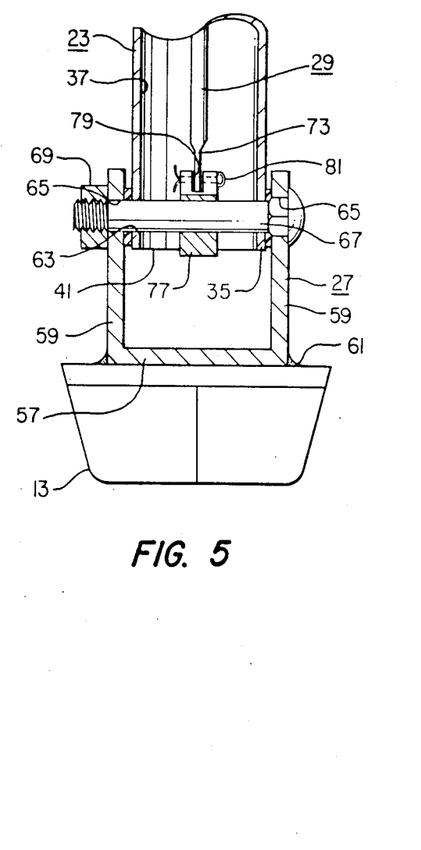
FIG. 5 is a longitudinal cross-sectional view of the mounting apparatus, taken through lines V—V of FIG. 3, showing how the transducer mounting bracket is pivotally mounted.
Figure 6:
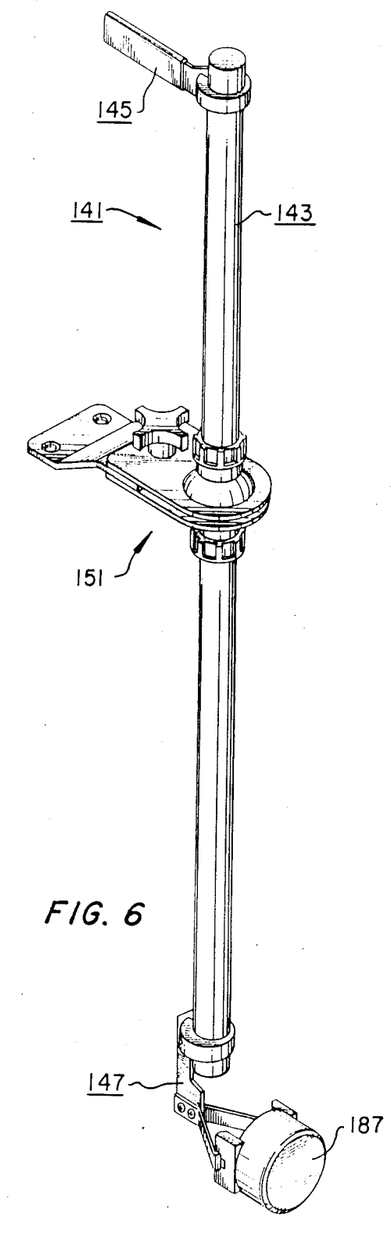
FIG. 6 is a top front isometric view of the mounting apparatus of the present invention in accordance with another embodiment.
Figure 7:
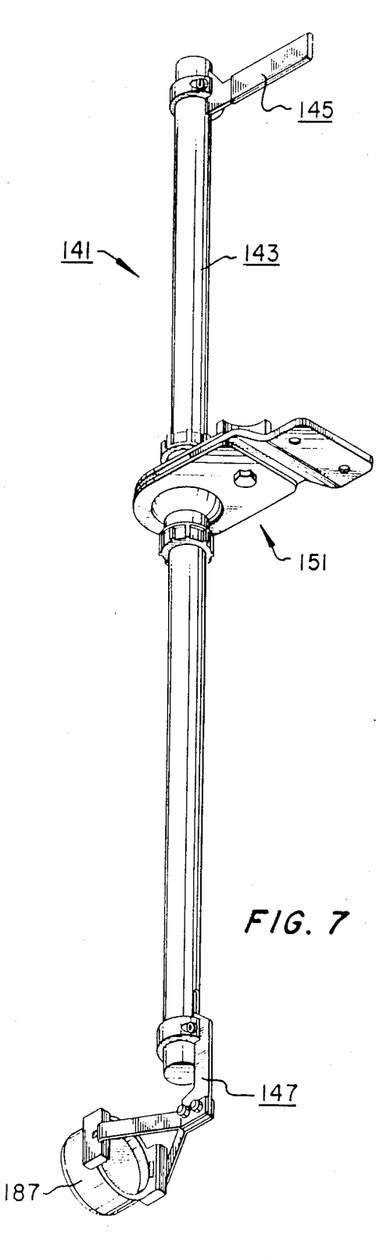
FIG. 7 is a lower rear isometric view of the apparatus of FIG. 6.

The transducer mounting bracket 27 is located at the second end 35 of the tubular member 23. Referring to FIGS. 3 and 5, the transducer mounting bracket 27 has a rectangular bottom plate 57 and two side plates 59 that extend perpendicularly from opposite sides of the bottom plate. The bottom plate 57 is coupled to the back of the sonar transducer 13. In the preferred embodiment, adhesive 61 is used to couple the transducer to the bottom plate, however, alternative configurations of some sonar transducers may allow the bolting of the transducer mounting bracket to the transducer. The distance between the side plates 59 is slightly greater than the diameter of the tubular member 23 so that the tubular member second end 35 is received by the space between the side plates. The tubular member second end 35 and the side plates 59 have respective circular openings 63, 65 for receiving a bolt 67. The bolt 67, which is parallel to the handle bolt 53, extends through the opening 65 in one of the side plates 59, through one of the tubular member openings 63, into the interior cavity 37, through the other of the tubular member openings, and through the opening in the other side plate. A nut 69 retains the bolt 67 in place. The transducer mounting bracket 27 can pivot between first and second orientations A', B'. In the first orientation A', the bottom plate 57 is perpendicular to the tubular member longitudinal axis, wherein the sonar transducer 13 is oriented perpendicular to the tubular member longitudinal axis. In the second orientation B', the bottom plate 57 is parallel to the tubular member longitudinal axis, wherein the sonar transducer 13 is oriented parallel to the tubular member longitudinal axis.

The linkage rod 29 has first and second ends 71, 73 and is made out of a stiff material such as steel (see FIGS. 3-5). The linkage rod 29 is located in the tubular member interior cavity 37 with the first end 71 pivotally coupled to the handle 25 and the second end 73 pivotally coupled to the transducer mounting bracket bolt 67. The first end 71 is located adjacent to the short segment 47 of the handle 25 where a pin 75 extends through the rod first end 71 and through the handle to pivotally couple the rod to the handle. The pin 75 extends through the handle at a point that is between the longitudinal axis of the tubular member and the slot 43, and along a first imaginary line extending through the center of the bolt 53 at about a 45 degree angle from the tubular member longitudinal axis. With the pin 75 so positioned, as the handle 25 is moved from the first orientation A to the second orientation B, the linkage rod 29 is pushed towards the tubular member second end 35. The linkage rod 29 is bent slightly at the first end portion to avoid interference with any motions of the handle (see FIG. 4). The second end 73 of the linkage rod 29 is pivotally coupled to a linkage member 77 that extends radially from the transducer mounting bracket bolt 67. The linkage member 77 is fixedly coupled to the shank of the bolt 67. At the free end of the linkage member is a notch 79 for receiving the second end 73 of the linkage rod 29. A pin 81 pivotally secures the linkage rod 29 to the linkage member 77. The pin 81 is located along a second imaginary line that extends through the center of the bolt 67 and that is parallel to the first imaginary line through the handle bolt 53.

With the linkage rod connected as described above, the first orientation A of the handle 25 corresponds to the first orientation A' of the transducer mounting bracket 27 and of the transducer 13. Likewise, the second orientation B of the handle 25 corresponds to the second orientation B' of the transducer mounting bracket 27 and of the transducer 13.

The mounting assembly 31 includes a ball 83, two plates 85, a setting screw 87, a bracket 89, and a collar 91 (see FIG. 3). The ball 83 has a cylindrical bore 93 through its center. The cylindrical bore 93 is sized to matingly receive the tubular member 23 such that the ball is located between the tubular member first and second ends. The cylindrical bore 93 has a circumferential groove for receiving an O-ring 95. The O-ring 95 extends circumferentially around the tubular member 23 when the tubular member is installed in the ball 83. Each plate has a circular opening 97 formed therethrough. The diameter of each circular opening 97 is slightly less than the diameter of the ball 83. The plates 85 are fitted onto the ball 83 such that each plate opening 97 receives a respective hemisphere of the ball 83. The plates 85 are oriented parallel to each other, with a gap 99 therebetween. The upper plate has a bore 100 and the lower plate has a threaded bore 101, which bores are aligned with each other. The bores 100, 101 receive the setting screw 87, which has a knob 103 for ease of turning The ball 83, and the tubular member 23, are retained by the plates 85. The setting screw 87 is used to adjust the compressive forces exerted by the plates 85 on the ball 83. When the setting screw 87 is tightened to cause the plates 85 to exert compressive forces on the ball 83, the ball 83 is unable to rotate relative to the plates 85. When the setting screw 87 is loosened to relieve the compressive forces caused by the plates on the ball, the ball, and thus the tubular member, can pivot relative to the plates. The plates also have respective rectangular grooves 105 that receive a bar 107 on the bracket 89. The collar 91 is located around the tubular member 23 above the ball 83. The collar 91 has a set screw 109 for fixing the position of the collar along the tubular member.

The bracket 89 has first, second, and third integral plates 111, 113, 115. The first and third plates 111, 115 are parallel to each other and are perpendicular to the second plate 113. The first and third plates 111, 115 are coupled to opposite sides of the second plate 113 and extend in opposite directions from each other. The third plate 115 has holes 117 for receiving bolts 119 (see FIG. 2) that bolt the bracket 89 to a boat deck 121. The length of the second plate 113, which is the distance between the first and third plates 111, 115, is as long as necessary to extend the first plate over the boat gunwale 123. The bar 107 is at the free end of the first plate 111. The bar 107 extends slightly above and below the first plate 111 so as to form lips.

Figure 2:
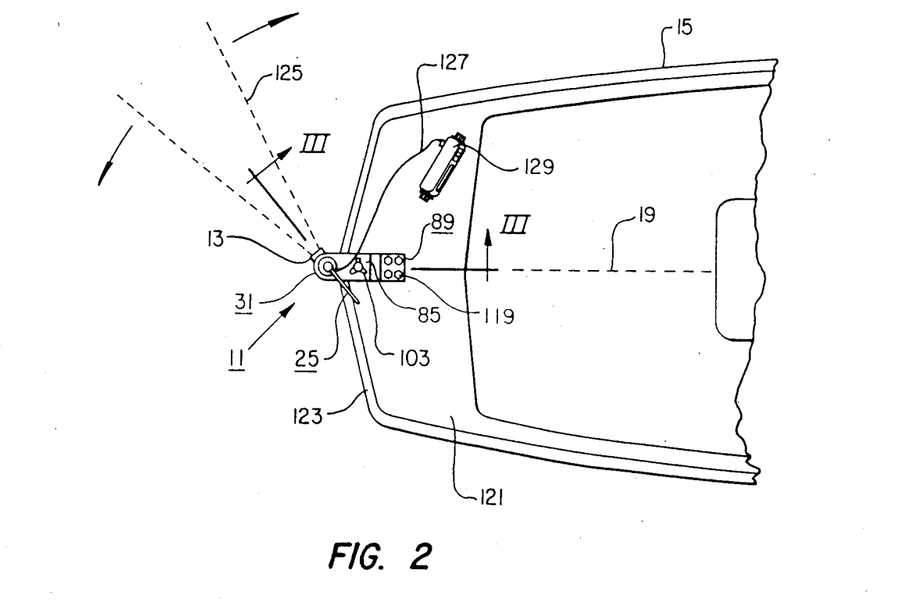
FIG. 2 is a plan view of the boat bow portion of FIG. 1.

The mounting apparatus 11 is set up by mounting the bracket 89 to the boat deck 121. The third plate 115 is laid flat on the boat deck so that the first plate 111 extends out over the gunwale 123. In FIGS. 1 and 2, the mounting bracket 89 is shown mounted on a raised deck 121 at the bow of the boat 15. The mounting apparatus 11 can, however, be mounted anywhere on the boat, as for example on a gunwale The tubular member 23 is vertically oriented, with the sonar transducer 13 submerged, and the handle located at a higher position than the boat gunwale 123 for easy access by the operator.

The sonar transducer 13 is conventional and produces a conically shaped sonar beam 125 that widens as the distance from the transducer increases. The conical beam 125 gives the transducer a directional capability. The transducer 13 has a cord 127 for electrical connection to a conventional display unit 129. The display unit 129 is positioned at some convenient location on the boat. The cord 127 is routed from the sonar transducer 13, through the interior cavity 37, and out through the slot 43.

The operation of the mounting apparatus 11 of present invention will now be described. The orientation of the sonar transducer 13 can be changed to scan areas of water directly beneath the boat and areas that are near the surface 21 of the water. A particular area can be scanned by adjusting the elevational and azimuthal orientations of the transducer 13 accordingly. The elevational orientation is referenced with respect to the water line 17 of the boat (which is the same as the surface 21 of the water when the boat is in the water). Referring to FIGS. 1 and 3, with the handle 25 and the transducer mounting bracket 27 in their respective first orientations A, A', the transducer 13 is pointed directly down to produce a sonar beam that is generally perpendicular to the boat water line 17. To change elevational orientation of the transducer, the operator grips the long segment 45 of the handle 25 to move the handle down towards the second orientation B, wherein the linkage rod 29 is pushed down, causing the linkage member 77, the bolt 67, the transducer mounting bracket 27, and the transducer 13 to pivot upwardly to the new orientation B'. With the handle 25 and the transducer mounting bracket 27 in their respective second orientations B, B', the sonar beam is generally parallel to the boat water line 17 and allows scanning of areas just below the surface 21 of the water. Intermediate elevational orientations between the first and second orientations of the transducer can be achieved by positioning the handle between its first and second orientations. The angle of the long segment 45 of the handle relative to the boat water line 17 is the same as the elevational orientation of the sonar transducer 13, thus providing a visual indication of the transducer orientation to the boat operator.

The azimuthal orientation is referenced with respect to the center line 19 of the boat. Referring to FIG. 2, the azimuthal orientation of the transducer 13 can be changed by moving the handle 25 to one side, thereby causing the tubular member 23 to turn about its longitudinal axis. The tubular member 23 turns within the cylindrical bore 93 of the ball 83. The handle 25 is moved in the opposite direction to the desired transducer movement. The angle of the handle 25 relative to the boat center line 19 is the same as the azimuthal orientation of the sonar transducer, thus providing a visual indication of the transducer orientation.

By combining various combinations of elevational and azimuthal orientations, any area of water around the boat can be scanned with the sonar instrumentation. The operator can change the orientation of the transducer without having to reach down into the water. Instead, the transducer can be remotely manipulated by the handle 25. Furthermore, the direction of handle movements correspond to the direction of transducer movements, thus simplifying operation.

The depth of the sonar transducer can be set by loosening the collar 91 on the tubular member 23 and then raising or lowering the tubular member. The collar 91 is loosened by loosening the set screw 109. When the tubular member is at its desired position relative to the ball 83, the set screw 109 is retightened to tighten the collar 91 onto the tubular member 23 just above the ball 83. If the transducer is positioned deeper than the boat hull so that the boat hull will not interfere with the sonar beam, then a sonar scan of 360 degrees can be obtained.

The tubular member 23 can be pivoted relative to the plates 85 and thus to the boat 15 by loosening the setting screw 101, 103 so that the ball 83 can rotate between the plates 85. This allows the tubular member 23 to be positioned in a vertical orientation regardless of the mounting configuration to the boat. A bull's eye level 131 can be affixed to the first end 33 of the tubular member to assist in the vertical alignment.

The mounting apparatus 11 can be easily removed from the boat 15 for towing or storage. The setting screw 101, 103 is loosened to unclamp the two plates 85 from the bracket bar 107. When sufficiently loose, the plates 85 are slid parallel to the bracket bar 107 to disengage the bar. Thus, the bracket 89 can remain bolted to the boat deck.

In FIGS. 6-12, there is shown the mounting apparatus 141 of the present invention, in accordance with another embodiment. The mounting apparatus 141 includes a tubular member 143, a handle 145, a transducer mounting bracket 147, a linkage rod 149, and a mounting assembly 151.

Figure 8:
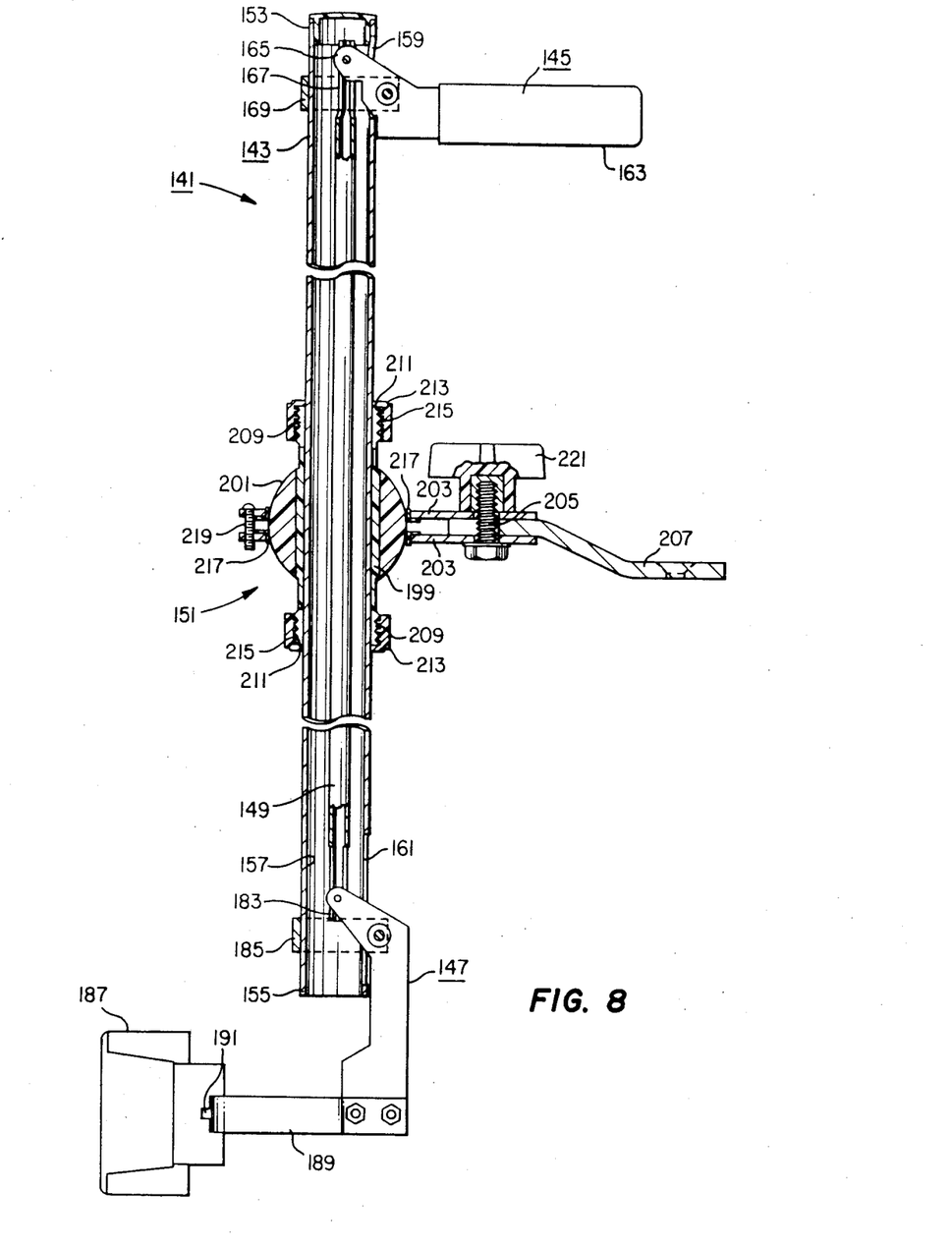
FIG. 8 is a longitudinal cross-sectional view of the mounting apparatus.

Referring to FIG. 8, the tubular member 143 has first and second ends 153, 155 and an interior cavity 157 with openings 159, 161 at the first and second ends. The handle 145 is similar to the handle 25 shown in FIG. 3. The handle 145 is provided with a rubber grip 163.

The handle 145 is pivotally coupled to the transducer mounting bracket 147, by way of the linkage rod 149. The linkage rod 149 is disposed within the cavity 157 of the tubular member 143. The handle 145 and the transducer mounting bracket 147 are pivotally coupled to the respective ends of the linkage rod 149, and are also pivotally coupled to the respective ends of the tubular member 143.

An inner end 165 of the handle 145 is received by the first end opening 159 of the tubular member 143, where the inner end is pivotally coupled to the first end 167 of the linkage rod 149. The first and second ends 167, 183 of the linkage rod 149 are bifurcated to form slots so as to receive the handle 145 and the transducer mounting bracket 147 respectively. The handle 145 has an opening 168 at its inner end. The handle opening 168 is aligned with a similar opening at the first end 167 of the linkage rod 149. A cotter pin is inserted through the openings to pivotally secure the handle 145 to the linkage rod 149.

Figure 9:
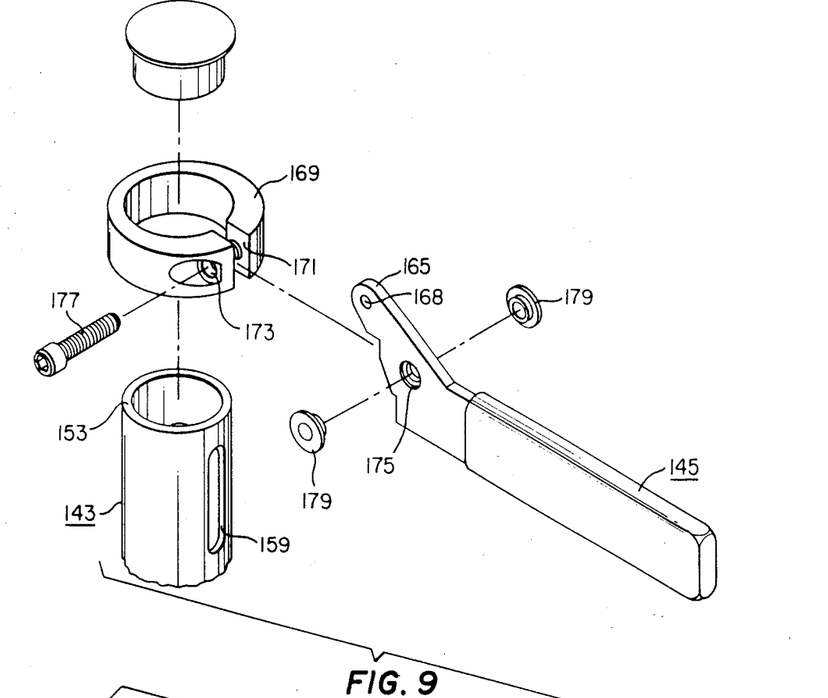
FIG. 9 is an exploded isometric view of the handle mounting arrangement.

The handle 145 is pivotally coupled to the first end portion of the tubular member 143 by way of an upper band clamp 169 (see also FIG. 9). The band clamp 169 is secured to the outside diameter of the tubular member 143 by rivets (not shown). The band clamp 169 has a gap 171 therein for receiving the handle 145. The band clamp 169 and the handle 145 have respective openings 173, 175 for receiving a screw 177. The screw 177 is the pivot point about which the handle 145 pivots. One side of the band clamp opening 173 is threaded, so that the screw 177 can be turned to adjust the size of the gap 171, thereby adjusting the clamping force that is applied to the handle by the band clamp. Teflon (polytetrafluoroethylene) washers 179 are interposed between the handle and the band clamp to provide smooth pivoting of the handle.

The transducer mounting bracket 147 is a flat plate. An inner end 181 of the transducer mounting bracket 147 is pivotally coupled to the second end 183 of the linkage rod 149. The inner end 181 is received by the second end opening 161 of the tubular member 143. The inner end 181 has an opening 182 which is aligned with a similar opening in the second end 183 of the linkage rod 149. A cotter pin 184 (see FIG. 11) is inserted through the openings to pivotally couple the transducer mounting bracket 147 to the linkage rod 149.

Figure 10:
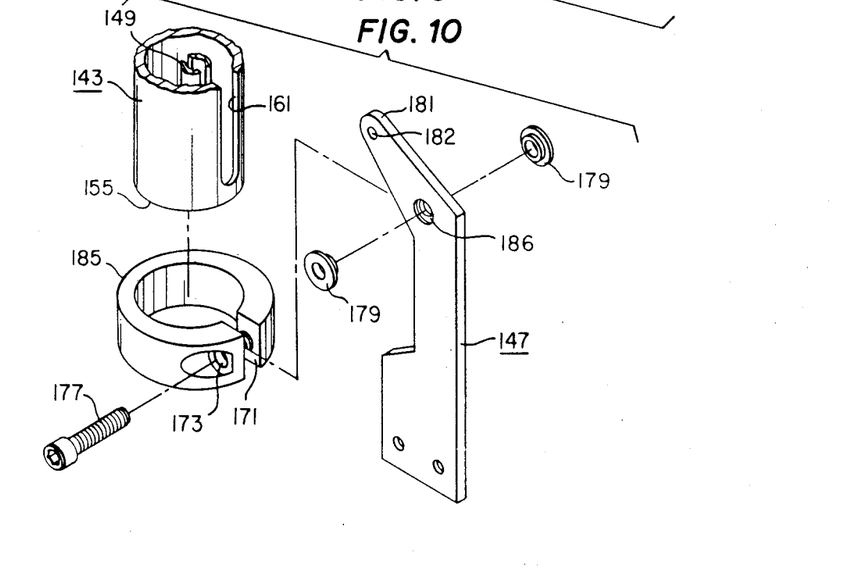
FIG. 10 is an exploded isometric view of the mounting arrangement for the transducer mounting bracket.

The transducer mounting bracket 147 is pivotally coupled to the second end portion of the tubular member by a lower band clamp 185. As shown in FIG. 10, the lower band clamp 185 is similar to the upper band clamp 169. The lower band clamp is secured to the outside diameter of the tubular member 143 by rivets (not shown). The transducer mounting bracket 147 has an opening 186 for receiving a screw 177. As with the upper band clamp 169, the gap 171 of the lower band clamp 185 can be increased or decreased to adjust the clamping force on the transducer mounting bracket 147. The transducer mounting bracket 147 pivots about the respective screw 177.

Figure 11:
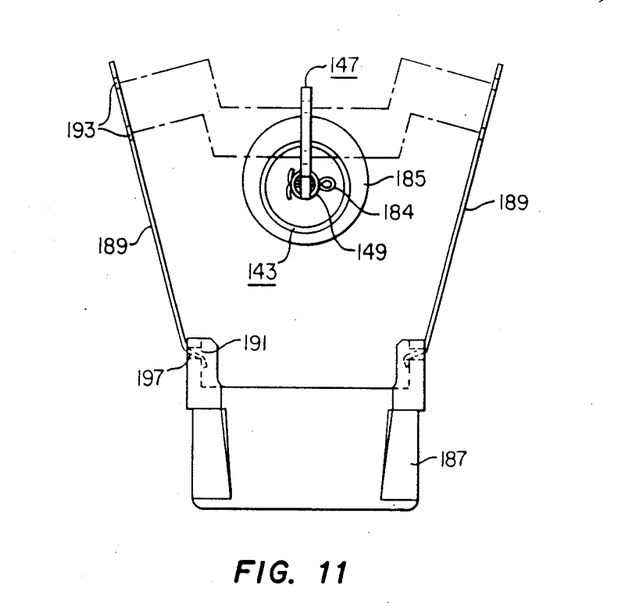
FIG. 11 is a bottom plan view of the mounting apparatus of FIG. 8, showing the transducer before coupling to the transducer mounting bracket with mounting strips.
Figure 12:
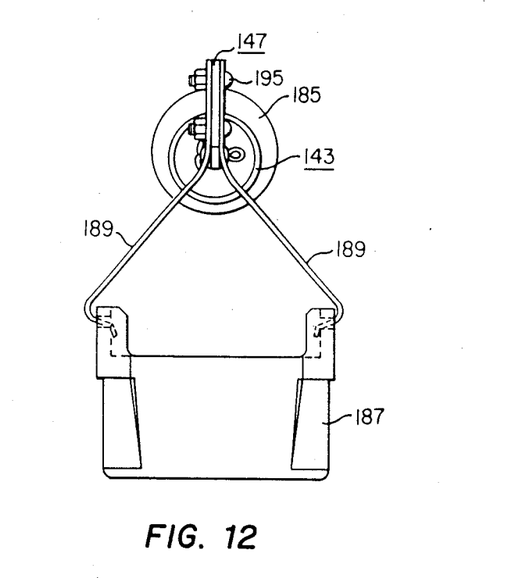
FIG. 12 is a bottom plan view of the mounting apparatus of FIG. 8, showing the transducer coupled to the transducer mounting bracket.

The transducer 187 is mounted to the transducer mounting bracket 147 by way of stiff and resilient strips 189 of metal. Referring to FIGS. 11 and 12, commercially available transducers 187 have slots 191 on their rear sides for receiving fastening means. Each strip 189 has two ends One end has openings 193 for receiving screws 195 passing through the transducer mounting bracket 147. The other end is bent into an "S" shape 197. The bent end 197 of each strip is inserted through the respective transducer slot 191, from the outside (see FIG. 11). Then, the transducer 187 is placed next to the transducer mounting bracket 147 as shown in FIGS. 8 and 11, and the free ends of the strips 189 are bent to contact the transducer mounting bracket 147 (see FIG. 12). Screws 195 are used to secure the strips 189 to the transducer mounting bracket 147. Because the strips 189 are resilient, they act like springs, and securely mount the transducer to the transducer mounting bracket. Furthermore, the strips 189 are versatile in that they will mount any size transducer to the transducer mounting bracket.

The transducer 187 is oriented so as to point perpendicularly from the tubular member 143 when the handle 145 is also pointed perpendicularly (see FIG. 8). The transducer mounting bracket 147 extends downwardly and is parallel to the tubular member 143. When the handle 145 is lifted to an up position, wherein the handle is parallel to the tubular member 143, the transducer 187 points straight down, and the transducer mounting bracket 147 is perpendicular to the tubular member.

The mounting assembly 151 includes a sleeve 199, a ball 201, two plates 203, a mounting screw 205, a bracket 207, and an adjusting screw 219. The sleeve 199 has an inside diameter that is slightly larger than the outside diameter of the tubular member 143. Thus, the tubular member 143 can slide inside of the sleeve 199. Each end of the sleeve has plural longitudinally extending slits 209 that allow the inside diameter of the sleeve ends to expand or contract The ends of the sleeve have external threads 211 to receive threaded nuts 213. The threads 211 on the sleeve 199 have a triangular cross-sectional shape, whereas the threads 215 on the nuts 213 have a rectangular cross-sectional shape. Thus, as the nuts 213 are tightened onto the sleeve 199, the inside diameter of the sleeve ends are reduced. The sleeve ends clamp onto the tubular member, preventing any movement of the tubular member 143 relative to the sleeve 199.

The sleeve 199 is received by a cylindrical bore in the ball 201. The sleeve 199 and the ball 201 are coupled together with a suitable adhesive material. Alternatively, the sleeve and ball can be threaded together and secured with an adhesive The plates 203, which are similar to the plates 85 shown in FIG. 3, have circular openings for receiving respective hemispheres of the ball 201. Each plate opening is fitted with a Teflon washer 217 to provide smooth pivoting of the plates 203 relative to the plastic ball 201. The mounting screw 205 and its knob 221 clamp the plates 203 together and onto the bracket 207. The adjusting screw 219 is used to adjust the compressive forces exerted by the plates on the ball and on the bracket. The adjusting screw 219 is located diametrically opposite the ball 201 from the mounting screw 205.

Figure 14:
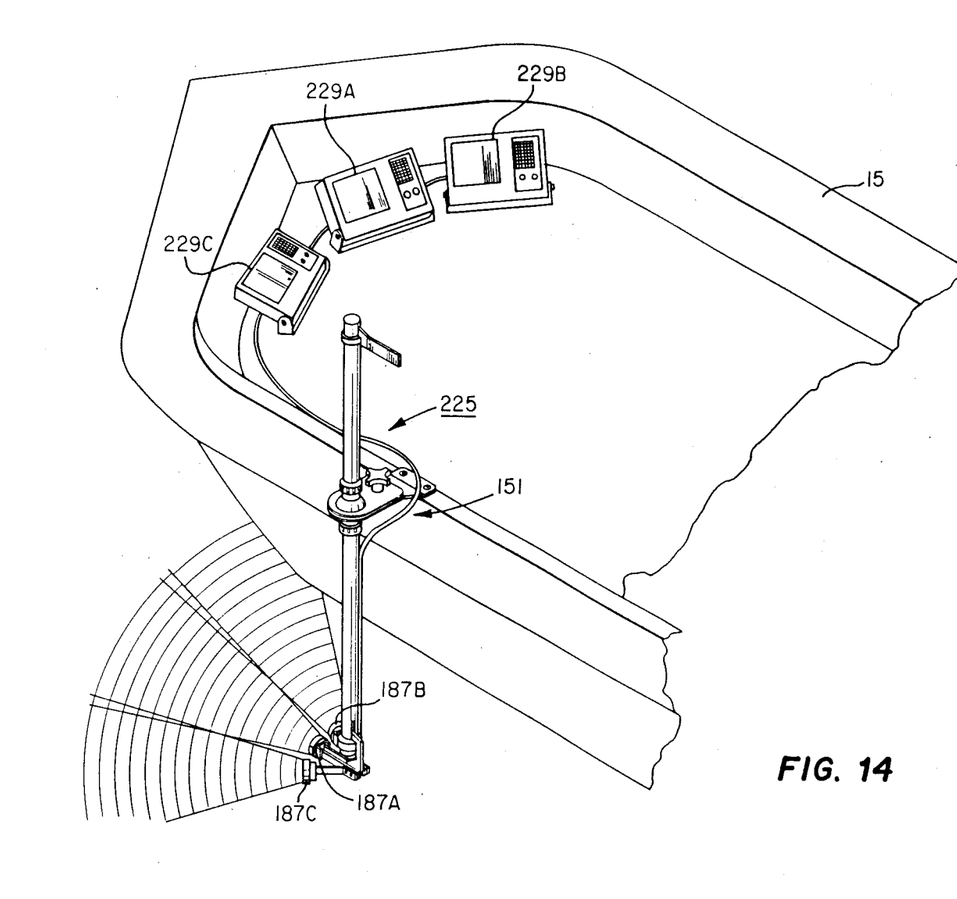
FIG. 14 is an isometric view of the bow portion of a boat, with the mounting apparatus of FIG. 13 and plural display screens.

To install the apparatus 141 onto a boat, the bracket 207 is mounted to the boat hull (see FIG. 14). The knob 221 is loosened so that the apparatus 141 can be mounted onto the bracket 207, such that the bracket 207 is received by the plates 203. The knob is then tightened so as to clamp the bracket 207 between the plates 203. The transducer 187 is then electrically connected to the display screen unit In FIG. 8, the electrical cord is omitted for clarity.

The operation of the mounting apparatus 141 will now be described. To change elevational orientation of the transducer 187, the handle 145 is raised or lowered as described above. To change azimuthal orientation, the nuts 213 on the sleeve 199 are loosened somewhat to permit rotation of the tubular member 143 relative to the sleeve. The nuts 213 can be adjusted so as to permit rotation but resist sliding of the tubular member in the sleeve. Alternatively, the adjusting screw 219 can be adjusted so as to permit rotation of the tubular member 143, the sleeve 199 and the ball 201 relative to the plates 203. The handle 145 is used to rotate the tubular member 143.

With the apparatus of the present invention, the depth adjustment is simple. To adjust the depth of the transducer 187, the nuts 213 are loosened to allow the tubular member 143 to slide up or down relative to the sleeve 199. When the transducer is at the desired depth, the nuts 213 are retightened to maintain the depth setting.

The compressive force of the plates 203 on the ball 201 can be adjusted with the adjusting screw 219 to permit the tubular member 143 to swing back if the transducer 187 hits an underwater obstacle. By allowing the apparatus to "give", the probability of impact damage is lessened.

It is desirable to provide enough frictional resistance at the pivot points of the handle 145 and the transducer mounting bracket 147 to maintain the transducer in the selected position. This enables the operator to point the transducer and remove his hands to perform other tasks such as fishing or steering the boat. Over a period of time use of a mounting apparatus causes the pivot points to loosen up. This occurs as a result of wear. When such looseness occurs, the transducer 187, which is typically heavy, with fall to lowermost position. To maintain the transducer in a selected position, the operator must manually maintain control of the handle. With the apparatus of the present invention, the ease of pivotal movement of the handle 145 and the transducer mounting bracket 147 is adjustable. If the transducer slips and refuses to hold a position, the screws 177 can be tightened to increase the clamping force. By tightening the screws 177, the respective band clamps 169, 185 increase compressive force on the respective handle and the transducer mounting bracket. By loosening the screws 177, the respective band clamps decrease the compressive force, and provide ease of handle movement. The resistance to pivotal movement can thus be adjusted to retain the position of the transducer, while still allowing ease of handle movement. With the pivotal movement resistance properly set, the operator can point the transducer in the desired direction and take his hand off the handle to attend to other tasks, wherein the transducer will hold its position.

Figure 13:
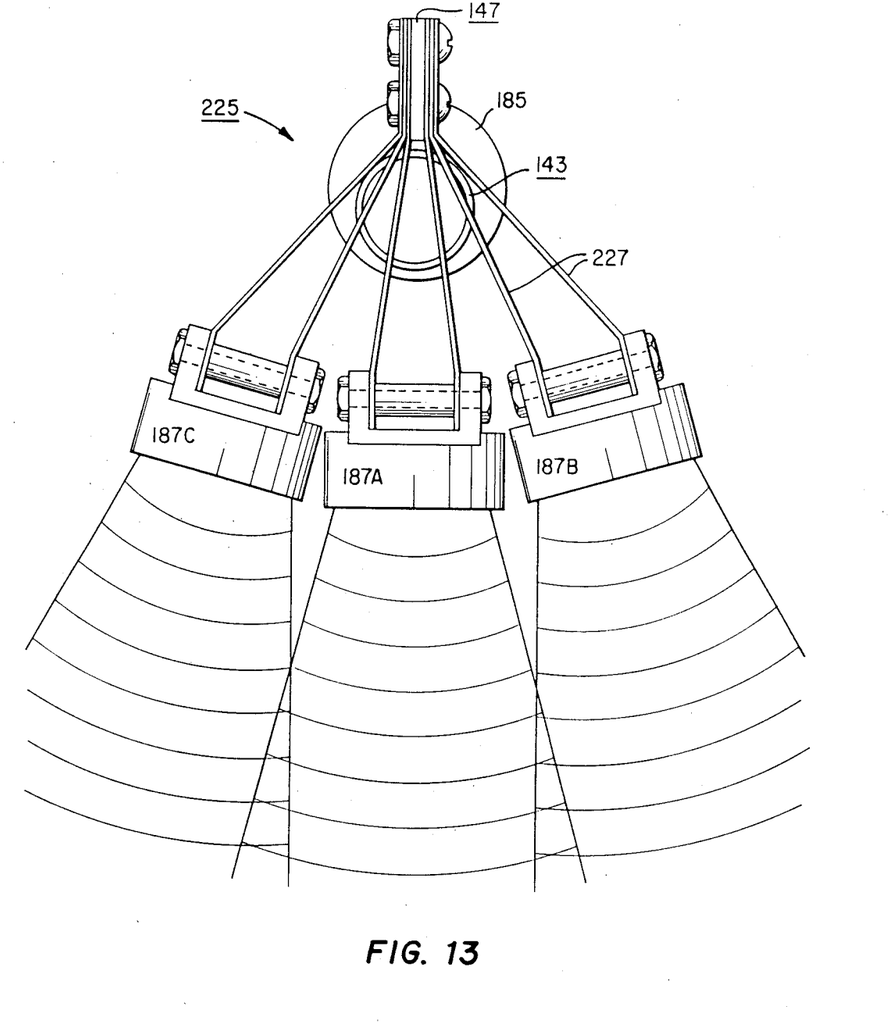
FIG. 13 is a bottom plan view of the mounting apparatus in accordance with another embodiment, which mounting apparatus has plural transducers.

In FIGS. 13 and 14, there is shown the mounting apparatus 225 in accordance with another embodiment. In this embodiment, plural transducers 187 are provided in order to enhance the tracking capability of the sonar equipment.

The apparatus 225 shown in FIGS. 13 and 14 has three transducers 187A, 187B, 187C mounted to the transducer mounting bracket 147. Each transducer is mounted with a pair of metal strips 227. The strips 227 are bolted to the transducer mounting bracket 147; the strips are also secured to the respective transducers. The transducers are linearly arranged such that there is a center transducer 187A and two lateral transducers 187B, 187C. The transducers are oriented with respect to each other such that their sonar beams are pointed in different, yet adjacent directions. Thus, the sonar beams of the center transducer 187A would point straight ahead, relative to the handle 145, while the sonar beams of the two lateral transducers 187B, 187C would point about 20–30 degrees off to the respective side. The sonar beams have some overlap.

The transducers are connected to three display screens having a positional arrangement that corresponds to the transducers. Thus, a center display screen 229A is connected to the center transducer 187A, the right hand display screen 229B is connected to the right hand transducer 187B, and the left hand display screen 229C is connected to the left hand transducer 187C.

To operate the apparatus 225, the sonar system is turned on, wherein all three transducers and display screens are activated. When a target, such as fish, is located, the transducers are manipulated until the target is displayed on the center screen 229A. With conventional apparatuses, where only one transducer is utilized, movement of the target off of the single screen often results in losing the target, because of uncertainty as to the direction of movement. With the apparatus of the present invention however, movement of the target off of the center screen 229A results in the target showing up on one of the lateral display screens 229B, 229C, thereby providing directional information. If the target continues to move, and disappears from the lateral screen, it can still be tracked. This is because if the target moves off of all screens, then the target is moving away from the sonar beams, whereas if the target moves to the center screen, then the target is staying in the sonar beams. The transducers can be moved to track the target. With the mounting apparatus of the present invention, wherein the transducers can be manipulated to change their elevational and azimuthal orientations, tracking is greatly simplified.

The foregoing disclosure and the showings made in the drawings are merely illustrative of the principles of the invention and are not to be interpreted in a limiting sense.

I claim:

1. An apparatus for mounting a sonar transducer to a boat, comprising:
   (a) an elongated first member having first and second end portions;

(b) handle means located at said first end portion of said first member, said handle means being pivotally coupled to said first member;

(c) transducer mounting means located at said second end portion of said first member, said transducer mounting means being adapted to couple to said transducer and being pivotally coupled to said first member such that said transducer can change elevational orientation with respect to a water line of said boat;

(d) an elongated second member located adjacent to said first member having first and second ends, said second member first end being coupled to said handle means and said second member second end being coupled to said transducer mounting means, wherein when said handle means is pivoted the elevational orientation of said transducer mounting means correspondingly changes;

(e) first member mounting means for mounting said first member to said boat, said first member mounting means comprising a sleeve and sleeve retaining means, said sleeve having a bore therethrough for receiving said first member, said first member being slidable with respect to said sleeve, said sleeve having an alterable inside diameter to selectively increase and decrease diameter, wherein when said sleeve has a small inside diameter, said first member is prevented from sliding and when said sleeve has a larger inside diameter, said first member is permitted to slide with respect to said sleeve, said sleeve having means for maintaining said small inside diameter, said sleeve retaining means being adapted to couple said sleeve to said boat, said first member mounting means allowing said first member, said handle means and said transducer mounting means to turn wherein the azimuthal orientation of said transducer mounting means changes.

2. An apparatus for mounting a sonar transducer to a boat, comprising:

(a) an elongated first member having first and second end portions;

(b) handle means located at said first end portion of said first member, said handle means being pivotally coupled to said first member;

(c) transducer mounting means located at said second end portion of said first member, said transducer mounting means being adapted to couple to said transducer and being pivotally coupled to said first member such that said transducer can change elevational orientation with respect to a water line of said boat;

(d) an elongated second member located adjacent to said first member having first and second ends, said second member first end being coupled to said handle means and said second member second end being coupled to said transducer mounting means, wherein when said handle means is pivoted the elevational orientation of said transducer mounting means correspondingly changes;

(e) first member mounting means for mounting said first member to said boat, said first member mounting means comprising a sleeve and sleeve retaining means, said sleeve having a bore therethrough for receiving said first member, said first member being slidable with respect to said sleeve, said sleeve retaining means being adapted to couple said sleeve to said boat, said first member mounting means allowing said first member, said handle means and said transducer mounting means to turn wherein the azimuthal orientation of said transducer mounting means changes;

(f) locking means for releasably locking said first member in position relative to said first member mounting means.

3. The apparatus of claim 2 wherein said sleeve retaining means comprises:

(a) a ball having a bore therethrough for receiving said sleeve, said sleeve being coupled to said ball;

(b) ball retaining means for retaining said ball so as to allow said first member to pivotally move with respect to said boat.

4. The apparatus of claim 3 wherein said ball retaining means comprises two plates having openings for receiving a respective hemispherical portion of said ball, said plates exerting adjustable compressive force on said ball so that said ball and said first member can be pivoted relative to said plates when said compressive force is lessened.

5. The apparatus of claim 4 wherein said sleeve has a longitudinal slit in one end to allow a change in inside diameter of said sleeve, said locking means comprises a threaded compression nut that is received by said one end of said sleeve, said compression nut decreasing the inside diameter of said sleeve as said nut is tightened onto said sleeve.

6. The apparatus of claim 4 further comprising clamp means for providing adjustable compressive force on said handle means so that the ease of pivotal movement of said handle means can be adjusted by adjusting the compressive force of said clamp means, said clamp means being coupled to said handle means and to said first member.

7. The apparatus of claim 2 wherein said sleeve has a longitudinal slit in one end to allow a change in inside diameter of said sleeve, said locking means comprises a threaded compression nut that is received by said one end of said sleeve, said compression nut decreasing the inside diameter of said sleeve as said nut is tightened onto said sleeve.

8. The apparatus of claim 2 further comprising clamp means for providing adjustable compressive force on said handle means so that the ease of pivotal movement of said handle means can be adjusted by adjusting the compressive force of said clamp means, said clamp means being coupled to said handle means and to said first member.

9. An apparatus for mounting a sonar transducer to a boat, comprising:

(a) an elongated first member having first and second end portions;

(b) handle means located at said first end portion of said first member, said handle means being pivotally coupled to said first member;

(c) clamp means for providing adjustable compressive force on said handle means so that the ease of pivotal movement of said handle means can be adjusted by adjusting the compressive force of said clamp means, said clamp means being coupled to said handle means and to said first member;

(d) transducer mounting means located at said second end portion of said first member, said transducer mounting means being adapted to couple to said transducer and being pivotally coupled to said first member such that said transducer can change elevational orientation with respect to a water line of said boat;

(e) an elongated second member located adjacent to said first member having first and second ends, said second member first end being coupled to said handle means and said second member second end being coupled to said transducer mounting means, wherein when said handle means is pivoted the elevational orientation of said transducer mounting means correspondingly changes;

(f) first member mounting means for mounting said first member to said boat such that said first member second end portion is submerged when said boat is in the water and said first member first end portion is above the water, said first member mounting means allowing said first member, said handle means, and said transducer mounting means to turn wherein the azimuthal orientation of said transducer mounting means changes.

10. The apparatus of claim 9 wherein said first member mounting means comprises:

(a) a ball having a bore therethrough for receiving said sleeve, said sleeve being coupled to said ball;

(b) ball retaining means for retaining said ball so as to allow said first member to pivotally move with respect to said boat.

11. The apparatus of claim 10 wherein said ball retaining means comprises two plates having openings for receiving a respective hemispherical portion of said ball, said plates exerting adjustable compressive force on said ball so that said ball and said first member can be pivoted relative to said plates when said compressive force is lessened.

12. The apparatus of claim 11 wherein said clamp means is a first clamp means, said apparatus further comprising a second clamp means for providing adjustable compressive force on said transducer mounting means so that the ease of pivotal movement of said transducer mounting means can be adjusted by adjusting the compressive force of said second clamp means, said second clamp means being coupled to said transducer mounting means and said first member.

13. The apparatus of claim 12 wherein said first and second clamp means each comprise a band around said first member, said bands having adjustable diameters, said first clamp means band clamping said handle means, said second clamp means band clamping said transducer mounting means.

14. The apparatus of claim 9 wherein clamp means comprises a band around said first member, said band having an adjustable diameter, said band clamping said handle means.

15. An apparatus for mounting a sonar transducer to a boat, comprising:

(a) an elongated first member having first and second end portions;

(b) handle means located at said first end portion of said first member, said handle means being pivotally coupled to said first member;

(c) transducer mounting means for coupling to said sonar transducer, said transducer mounting means comprising a plate member and stiff and resilient strips, said plate member being pivotally coupled to said first member such that said transducer can change elevational orientation with respect to a water line of said boat, said resilient strips coupling said transducer to said plate member such that said strips are deformed;

(d) an elongated second member located adjacent to said first member having first and second ends, said second member first end being coupled to said handle means and said second member second end being coupled to said transducer mounting means, wherein when said handle means is pivoted the elevational orientation of said transducer mounting means correspondingly changes;

(e) first member mounting means for mounting said first member to said boat such that said first member second end portion is submerged when said boat is in the water and said first member first end portion is above the water, said first member mounting means allowing said first member, said handle means, and said transducer mounting means to turn wherein the azimuthal orientation of said transducer mounting means changes.

16. An apparatus for mounting a sonar transducer to a boat, comprising (a) a tubular member having first and second end portions and an interior cavity extending between said first and second ends;

(b) handle means pivotally coupled to a first band located around said first member first end portion;

(c) transducer mounting means being pivotally coupled to a second band located around said first member second end portion;

(d) each of said first and second bands having an adjustable diameter so as to allow the adjustment of clamping force on said respective handle means and transducer mounting means;

(e) a linkage rod located in said interior cavity and having first and second ends, said linkage rod first end being pivotally coupled to said handle means, said linkage rod second end being pivotally coupled to said transducer mounting means, said transducer mounting means being pivotable by pivoting said handle means;

(f) first member mounting means for mounting said first member to said boat, said first member mounting means comprising a sleeve and sleeve retaining means, said sleeve having a bore therethrough for receiving said first member, said first member being slidable with respect to said sleeve, said sleeve having a longitudinal slit in one end to allow a change in sleeve diameter, said sleeve retaining means being adapted to couple said sleeve to said boat, said first member mounting means allowing said first member, said handle means and said transducer mounting means to turn wherein the azimuthal orientation of said transducer mounting means changes;

(g) locking means for releasably locking said first member in position relative to said first member mounting means, said locking means comprising a threaded compression nut that is received by said slitted sleeve end;

(h) said sleeve retaining means comprising a ball having a bore therethrough for receiving said sleeve and said ball retaining means for retaining said ball so as to allow said first member to pivotally move with respect to said boat, said sleeve being coupled to said ball;

(i) said ball retaining means comprising two plates having openings for receiving a respective hemispherical portion of said ball, said plates exerting adjustable compressive force on said ball so that said ball and said first member can be pivoted relative to said plates when said compressive force is lessened.

17. The apparatus of claim 16 comprising transducer mounting means for coupling to said sonar transducer, said transducer mounting means comprising a plate member and stiff and resilient strips, said plate member being pivotally coupled to said first member such that said transducer can change elevational orientation with respect to a water line of said boat, said resilient strips coupling said transducer to said plate member such that said strips are deformed.

18. An apparatus for mounting sonar transducers to a boat, comprising:
(a) a first member having first and second end portions;
(b) handle means pivotally coupled to said first member first end portion;
(c) transducer mounting means for coupling to said sonar transducers, said transducer mounting means being pivotally coupled to said first member second end portion such that said transducer mounting means can change elevational orientation with respect to a water line of said boat;
(d) a second member located adjacent to said first member, said second member coupled to said handle means and to said transducer mounting means so as to link said transducer mounting means to said handle means, wherein when said handle means is pivoted the elevational orientation of said transducer mounting means correspondingly changes;
(e) first member mounting means for mounting said first member to said boat, said first member mounting means having an opening for receiving said first member, said first member being able to slide in said opening relative to said first member mounting means, said first member mounting means allowing said first member, said handle means, and said transducer mounting means to turn wherein the azimuthal orientation of said transducer mounting means changes;
(f) retaining means for retaining said first member in a selected position relative to said first member mounting means;
(g) plural sonar transducers coupled to said transducer mounting means, said transducers producing sonar beams, said transducers being oriented relative to each other such that said beams are adjacent.

19. The apparatus of claim 18 comprising at least three sonar transducers.

20. The apparatus of claim 18 comprising at least three sonar transducers linearly arranged such that there is a center transducer and lateral transducers.

21. The apparatus of claim 18 further comprising plural display means for displaying sonar returns from said sonar transducers, with each of said display means being connected to a respective transducer, wherein said plural display means are in a spatial configuration with respect to one another that corresponds to the spatial configuration of said sonar beams.

* * * * *